United States Patent Office 3,447,667
Patented June 3, 1969

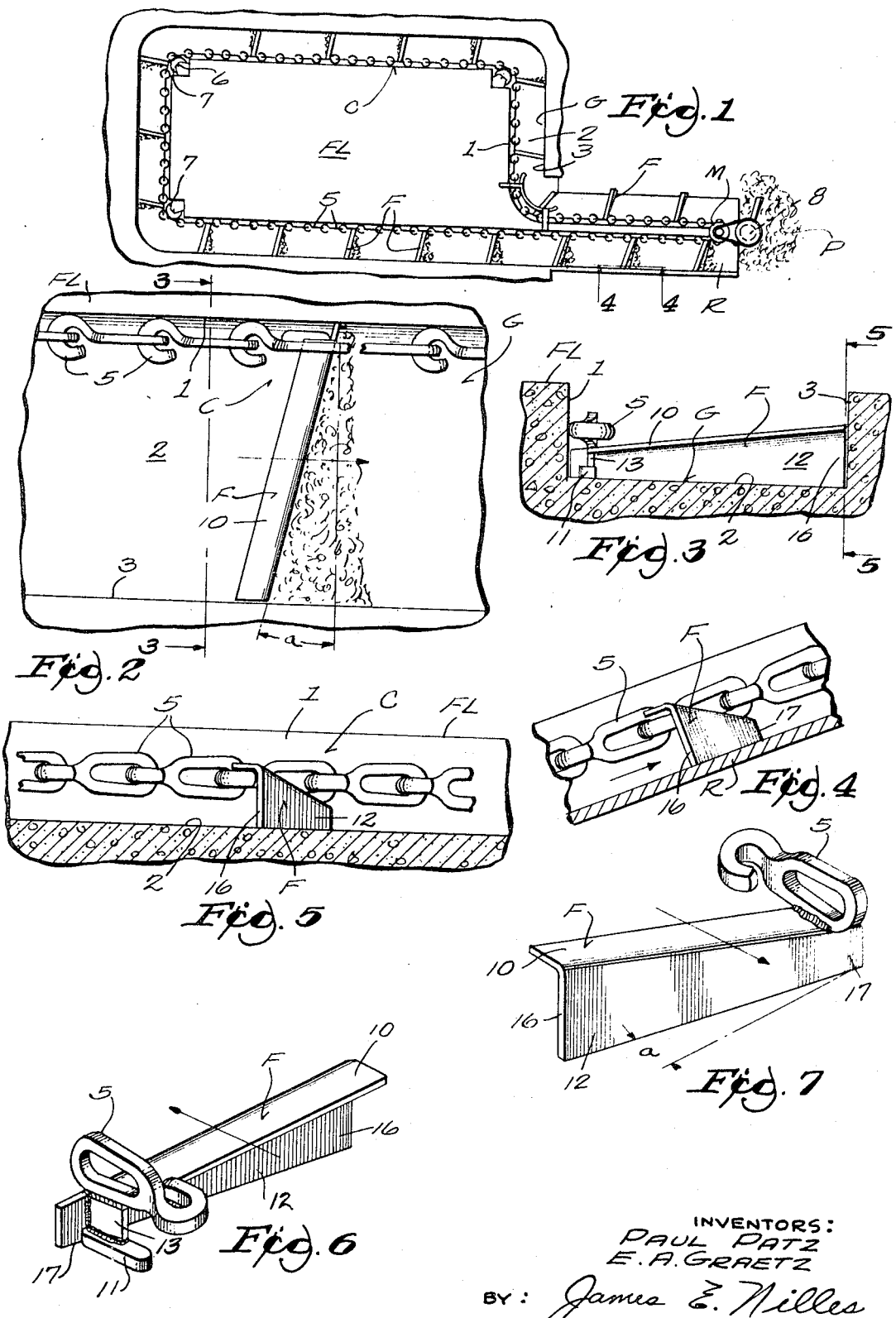

3,447,667
FLIGHT FOR BARN CLEANERS
Paul Patz and Edward A. Graetz,
both of Pound, Wis. 54161
Filed Oct. 2, 1967, Ser. No. 672,168
Int. Cl. B65g 19/08, 19/24
U.S. Cl. 198—171                                     7 Claims

ABSTRACT OF THE DISCLOSURE

A flight for an endless conveyor of a barn cleaner of the type having a series of flights spaced along its endless length and which pull the manure or the like through a trough in the barn floor for ultimate disposal at a remote location.

Background of the invention

The invention pertains to power driven conveyors having an endless chain along the length of which are fixed the flights which pull or push the material in a trough through which the flights move. The flights are formed of heavy steel and are secured at one end to the chain and extend outwardly therefrom at a rearwardly rake angle and the flight is also tapered along its length so as to be of a greater height at its outer, free end than it is at its inner end where it is attached to the chain.

The invention finds particular utility in barn cleaners of the type shown in the U.S. Patent No. 3,013,651 which issued on Dec. 19, 1961, and particularly when conveying semi-liquid manure or other material which normally flows over the top of conventional flights.

Summary of the invention

The invention provides an improved flight for an endless conveyor barn cleaner which has a series of such spaced apart flights that move through a trough and thereby convey the semi-liquid manure or other material through the trough to a discharge point. More specifically, the improved flight is rigidly secured at one end to the endless chain and extends rearwardly at an angle of about 14 degrees from normal to the chain; additionally, the flight is of gradually increasing height from its point of attachment to the chain to its outer, free end. For example, it has been found that a flight height of about two inches at the chain is preferable, and a height of about four inches at the end of a flight which is 18 inches long, is preferable. This arrangement provides an efficient "pocket" between the flight and its associated trough, in which pocket the liquid material, for example, is trapped and efficiently conveyed without spill over, particularly when the conveyor is moving up an incline. It has been found with such an arrangement, that by the time sufficient liquid is captured so as to be flowing over the low height end of the flight, the outer high end of the flight is also filled to capacity.

Brief description of the drawings

FIGURE 1 is a small plan view, more or less schematic in nature, of a barn floor showing the invention as utilized around the floor of the barn and extending outside the barn;

FIGURE 2 is an enlarged, fragmentary view of a portion of the trough and endless conveyor shown in FIGURE 1;

FIGURE 3 is a sectional view taken along line 3—3 in FIGURE 2;

FIGURE 4 is a sectional view taken along line 4—4 in FIGURE 1 but on an enlarged scale;

FIGURE 5 is a sectional view taken along line 5—5 in FIGURE 3;

FIGURE 6 is a perspective view of a flight made in accordance with the present invention, the view being taken generally from the rear, inside end of the flight; and FIGURE 7 is another perspective view of the flight, taken generally from the front, outer end thereof.

Description of the preferred embodiment

The improved conveyor C provided by the present invention is located, partially at least, in the barn gutter G which is formed on the floor FL of the barn, the gutter including an inside wall 1, the gutter bottom 2, and the outer side wall 3.

The conveyor is of the endless chain type having links 5 which are connected together for pivotal movement so as to provide flexibility for the conveyor as it moves around the barn through the trough and then upwardly out the barn and over the discharge pile P. Suitable corner posts 6 and wheels 7 are provided for guiding the chain around the corners, and a drive sprocket 8 furnishes power for driving the conveyor from the electric motor M or other source. The conveyor includes a series of flights F which are welded at their inner end to a link of the chain and which extend across the gutter for moving material along in the gutter. As the conveyor C leaves the barn, it travels upwardly to the end of the ramp R where it discharges the material conveyed thereby. The flights F then return downwardly back into the barn for another trip through the barn gutter.

The chain links themselves are conventional in nature and are welded to the top, horizontal flange 10 of the flight. A foot 11 is welded at the bottom edge of the rear, vertical flange 12 of the flight, and a gusset 13 is welded between the foot and flanges for rigidity. The foot slides along the gutter bottom and thus supports the inner portion of the conveyor and prevents the flight from tipping.

The material often found in environments of this nature include a semi-liquid manure which is frequently difficult if not impossible to handle in an efficient manner. Prior art devices have certain shortcomings, such as for example, the inability to load the fluid material evenly and convey it along the gutter and up the ramp without excessive spilling. Heretofore it has been difficult if not impossible to load the flight evenly across its length and further more difficult to contain the semi-fluid or fluid material.

In accordance with the present invention, the flights F are substantially co-extensive in length with the width of the gutter so as to occupy the entire width thereof. We have found that a rearward angle of approximately 14 degrees (FIGURES 2 and 7), in respect to the normal line of flight travel where the flight is welded to the chain, is particularly efficient for providing a good cleaning and sweeping action of the flight, while at the same time insuring that the flight loads evenly across its length. In addition, we have found that by making the height of the outer end 16 of the flight of a greater dimension than the inner end 17 of the flight, that is where it is attached to the chain, a pocket is formed between the outer end of the flight and the side wall and bottom of the gutter. It is in this pocket that the semi-liquid type manure, more particularly the fluid portion thereof, tends to collect.

We have found it particularly efficient to provide the varying height of the flight as follows. For a flight of approximately 18 inches in length, we have found that if the inner end where it is attached to the chain is made approximately 2 inches in height, while the outer end 16 of the flight is made approximately 4 inches in height, good loading and uniform conveying is provided. In other words, with such a dimensioning of parts, the liquid material is trapped and efficiently conveyed without spilling over and this is especially true when the conveyor is moving up the incline ramp. With this conveyor flight as described, by the time sufficient liquid material is captured so as to be flowing over the lower end of the flight, the outer or higher end of the flight is also filled to capacity.

The tapering height of the flight should preferably be gradual across its length and the above dimensioning of parts is particularly satisfactory regardless of the length of the flight. In other words, if a length of flight shorter than 18 inches were used, the outermost end of that flight would be lower than 4 inches. Conversely, if a longer flight than 18 inches is used, the outer end of the flight would be greater than 4 inches.

With the present invention, a particularly efficient conveyor has been provided, and one which not only loads evenly, especially when going up an incline, but also sweeps the gutter clean and prevents spill over of semi-liquid or liquid material.

We claim:

1. A barn cleaner of the type having an endless chain with laterally extending flights attached to and spaced along its length and which travel in a trough to contact and move material through said trough, said flights terminating in an outer free end, the improvement comprising, said flights extending rearwardly at an angle from the chain at the point of their attachment, said flights also being of tapering height along their length and being higher at their said outer free end than they are at their said point of attachment to said chain.

2. A cleaner of the type as set forth in claim 1 further characterized in that the rearward angle of said flight relative to said chain when the latter is moving in a straight line at said point of flight attachment is about 14 degrees.

3. A barn cleaner of the type having an endless chain with laterally extending flights each having an inner end attached to and spaced along the length of said chain and which travel in a trough to contact and move material through said trough, said flights terminating in an outer free end, the improvement comprising, said flights extending rearwardly at an angle from the chain at the point of their attachment, said flights having a front vertical flange and a rearwardly extending top flange, said flights also being of tapering height along their length and being higher at their said outer free end than they are at their said point of attachment to said chain, said flights being fixed at their inner ends to the underside of the links of said endless chain, and a shoe fixed to the bottom of said flights for sliding along said trough and stabilizing said flights against tipping.

4. A cleaner of the type as set forth in claim 3 further characterized in that the rearward angle of said flights relative to said chain when the latter is moving in a straight line at said point of flight attachment is about 14 degrees.

5. An endless chain conveyor for a barn cleaner, said conveyor including an endless chain and laterally extending flights attached to and spaced along the length of said chain and which flights travel in a trough to contact and move material through said trough, and flights terminating in an outer free end and extending rearwardly at an angle of about 14 degrees from the chain at the point of their attachment thereto, said flights also being of tapering height along their length and being higher at their said outer free end than they are at their said point of attachment to said chain.

6. The conveyor as defined in claim 5 further characterized in that said flights have a front vertical flange and a rearwardly extending top flange, and said flights are fixed by their top flange to said chain.

7. The conveyor as set out in claim 6 including a shoe fixed to said flights at the inner end thereof for preventing tipping of said flights.

References Cited

UNITED STATES PATENTS

| | | | |
|---|---|---|---|
| 2,544,191 | 3/1951 | Tomfohrde | 198—171 |
| 2,792,937 | 5/1957 | Searles | 198—171 |
| 3,013,651 | 6/1961 | Patz | 198—229 |
| 3,171,533 | 3/1965 | Ferg | 198—176 |

RICHARD E. AEGERTER, *Primary Examiner.*